Patented May 3, 1927.

1,626,818

UNITED STATES PATENT OFFICE.

JAMES ROBINSON HATMAKER, OF PARIS, FRANCE.

CONDENSED MILK AND METHOD OF MAKING SAME.

No Drawing. Application filed April 6, 1926, Serial No. 100,110, and in Great Britain November 5, 1925.

The condensed or evaporated milk of commerce, made by boiling natural milk for a considerable time in a vacuum apparatus, is dark in color and has a cooked or disagreeable taste.

I find that condensed milk of better taste and color can be made by drying a portion of a given quantity of natural milk in a suitable way and in then adding the fresh dry milk solids thus obtained to the remaining portion of the natural milk—preferably when the latter is moderately heated—and thoroughly incorporating them therewith. For example, to produce condensed milk containing about twice as much milk solids as natural milk, I dry one-half of a given quantity of fresh liquid milk so that the milk solids obtained in a dry state will have practically their natural solubility and taste and I then add these solids to the remaining half of the fresh liquid milk—preferably when it has a temperature a few degrees higher than it had when it came from the cow—and incorporate them thoroughly therewith by agitation, stirring or otherwise. In other words, I take practically all the water out of an important part of a given quantity of natural milk and then add the dry solids obtained to the remainder of the natural milk and thus obtain a liquid condensed milk that contains much more milk solids and much less water than natural milk. In this manner I obtain condensed milk of good quality which is convenient for many uses and which has a better color and taste than condensed milk made by boiling an entire mass of milk for a considerable time in vacuo.

The best and quickest way to dry the portion of natural milk to be dried that I know of is the process described in the specification of United States Letters Patent No. 920,952 of May 11, 1909, and I prefer for the present purpose to use milk solids obtained by that process of rapid drying but I do not limit my invention to milk solids obtained by that process for milk solids obtained in any way that does not materially affect their natural solubility and taste may be used.

Nor do I limit my invention to a product containing a particular percentage of solid matter for more or less dry milk may be added to the remaining natural milk to produce condensed milk of varying proportions of solid matter, without departing from the spirit of my invention.

Freshly dried milk is readily incorporated with fresh warm natural milk and it is desirable that the portion of natural milk to which the dried milk is added should be warmed between 100 and 125 degrees Fahrenheit to facilitate the incorporation by ordinary agitation or mixing. If the dry milk is in a very finely divided condition heating the natural milk to which it is added is not so necessary for the fat globules in very finely divided dry milk are broken up and will incorporate more easily. In no case should the natural milk be so heated as to affect its taste or quality.

To make a more perfect emulsion than can be made by simple agitation or mixing, the mixture of dry and natural liquid milk may be passed through an emulsor, if desired; and if it is desired to render it conservable for a considerable period of time, the mixture may be Pasteurized or sterilized in any suitable way.

I claim:

1. The hereinbefore described method of producing condensed milk which consists in incorporating dry milk solids with natural liquid milk.

2. The hereinbefore described method of producing condensed milk which consists in drying natural liquid milk and in then incorporating the dry solids obtained by such drying with natural liquid milk.

3. The method of producing condensed milk which consists in drying rapidly a portion of a given quantity of natural liquid milk and in then incorporating the dry milk solids thus obtained with the remaining portion of the liquid milk when the latter is warm, substantially as described.

4. The method of producing condensed milk which consists in drying a portion of a given quantity of liquid milk and in then adding the dry solids thus obtained to the remaining portion of such liquid milk and in emulsifying them together, substantially as described.

5. The method of producing condensed milk as claimed in claim 4 with the added step of sterilizing the emulsified milk obtained.

6. Condensed milk, an essential part of which is milk in its natural state.

7. Condensed milk as claimed in claim 6, but sterilized after its production to make it more conservable.

8. Condensed milk composed of liquid milk in its natural state and dry milk solids.

9. Condensed milk, comprising the solids obtained by drying a portion of a given quantity of natural liquid milk emulsified with the remaining portion of such milk.

JAMES R. HATMAKER.